May 22, 1962     C. O. MUSSER     3,035,356

COMPUTING APPARATUS

Filed Dec. 22, 1960     2 Sheets-Sheet 1

INVENTOR.
CLAIR OMAR MUSSER
BY
O'BRIAN & BLACKHAM
ATTORNEYS

United States Patent Office 3,035,356
Patented May 22, 1962

3,035,356
COMPUTING APPARATUS
Clair Omar Musser, 12997 Blairwood Drive,
Studio City, Calif.
Filed Dec. 22, 1960, Ser. No. 77,597
10 Claims. (Cl. 35—45)

This invention pertains to a new type of apparatus for use in computing and demonstrating relationships between parts of the solar system during the normal movements of such parts.

This application is related to the co-pending application Serial No. 743,403, filed June 20, 1958, now U.S. Patent No. 3,005,270, and entitled "Orrery." The entire disclosure of this co-pending application is incorporated herein by reference.

Devices such as are termed "orreries" in this co-pending application are planetarium type structures which may be very effectively used in demonstrating the heliocentric or Sun-centered character of our solar system. These devices incorporate centrally located means for simulating the Sun, various movable means simulating planets, the asteroid belt and other bodies which rotate around the Sun and a motor drive—for rotating these movable means at speeds which are proportional to the speeds at which the bodies simulated by them move around the Sun. From this type of device the movements of the planets may be readily visualized.

Orreries as shown in this co-pending application effectively demonstrate the Copernican concepts of the planets moving about the Sun. They do not, however, correlate these concepts with the geocentric concepts of astronomy which were accepted prior to the acceptance of the Copernican heliocentric concepts. For many purposes today a geocentric or earth-centered consideration of the movements of the planets of the solar system is necessary in order to adequately consider various types of problems such as problems which are encountered as a consequence of attempts to explore what is commonly referred to as "outer space."

To date and for some time to come the base for any space probe is and will be the planet Earth. Consequently all plans, measurements and calculations for space travel must be made geocentrically. The conventional methods for making such calculations are very complicated, time-consuming and expensive. This is particularly the case since the planet Earth itself travels approximately 66,000 miles per hour in traveling its approximately 590 million miles yearly orbit around the Sun. Various other planets of our solar system, of course, also travel at various different rates around the Sun. The relative positions of the planets vary constantly as a result of this travel.

An object of the present invention is to provide new and improved computing apparatus for facilitating geocentric measurements and calculations with respect to heliocentric and other bodies of our solar system itself. Another object of the present invention is to provide clock or ephemeris means for indicating the relative movements of various planets of our solar system with respect to time intervals. A related object of the present invention is to provide such clock or ephemeris means in conjunction with chart means so that various different geocentric measurements and calculations concerning the positions of bodies of our solar system at any past or future date may be easily and conveniently made.

A further object of the present invention is to provide computing apparatus of the general type indicated in the preceding discussion which may be easily manufactured at a comparatively nominal expense. A still further object of the invention is to provide computing apparatus as indicated in the preceding discussion which may be easily and conveniently used in making virtually any type of measurement and/or calculation required for a satisfactory understanding of our solar system and for use in accurately approximating a variety of factors pertaining to the exploration of outer space.

These and various other objects of this invention as well as many specific advantages of it will be more fully apparent from a detailed consideration of the remainder of this disclosure including the appended claims and the accompanying drawings in which:

Figure 1:
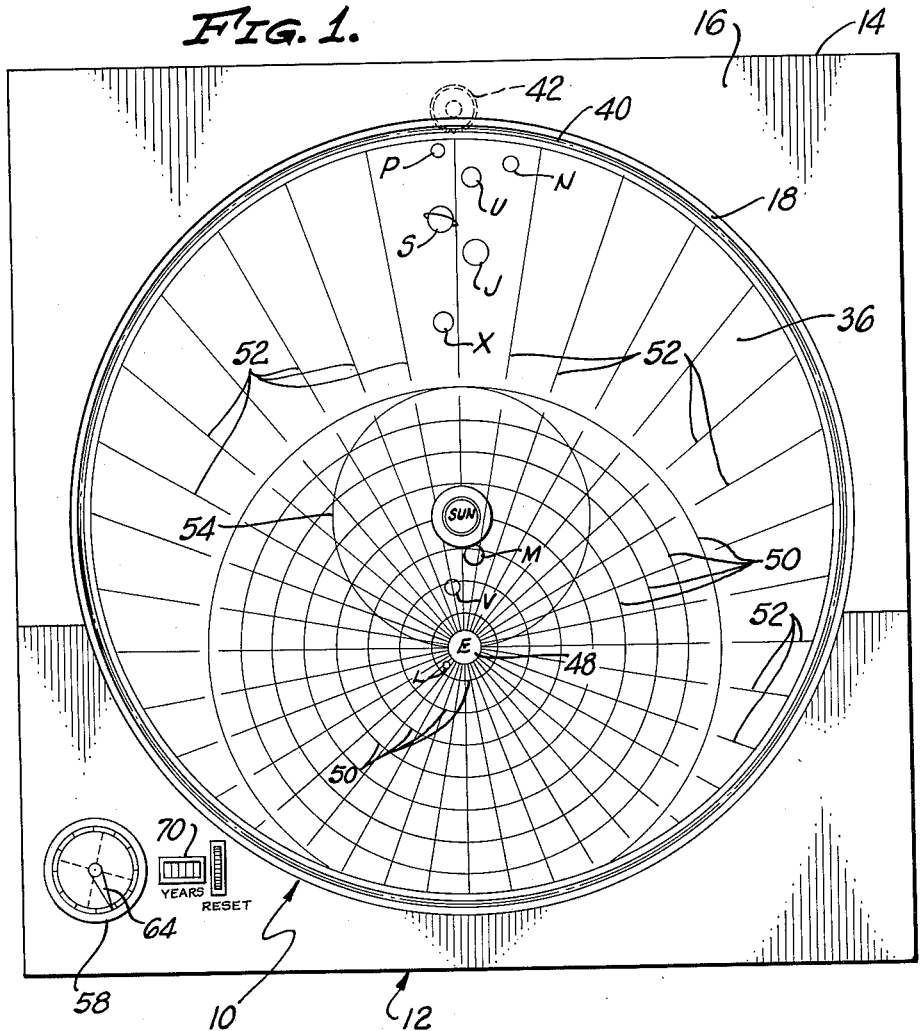
FIG. 1 is a front elevational view of a computing apparatus of this invention.
Figure 3:
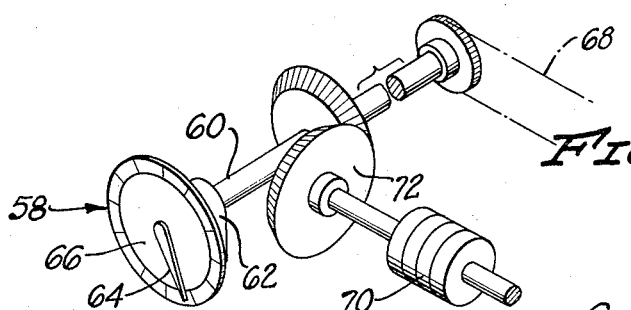
FIG. 3 is a perspective view indicating various parts employed in this apparatus.
Figure 2:
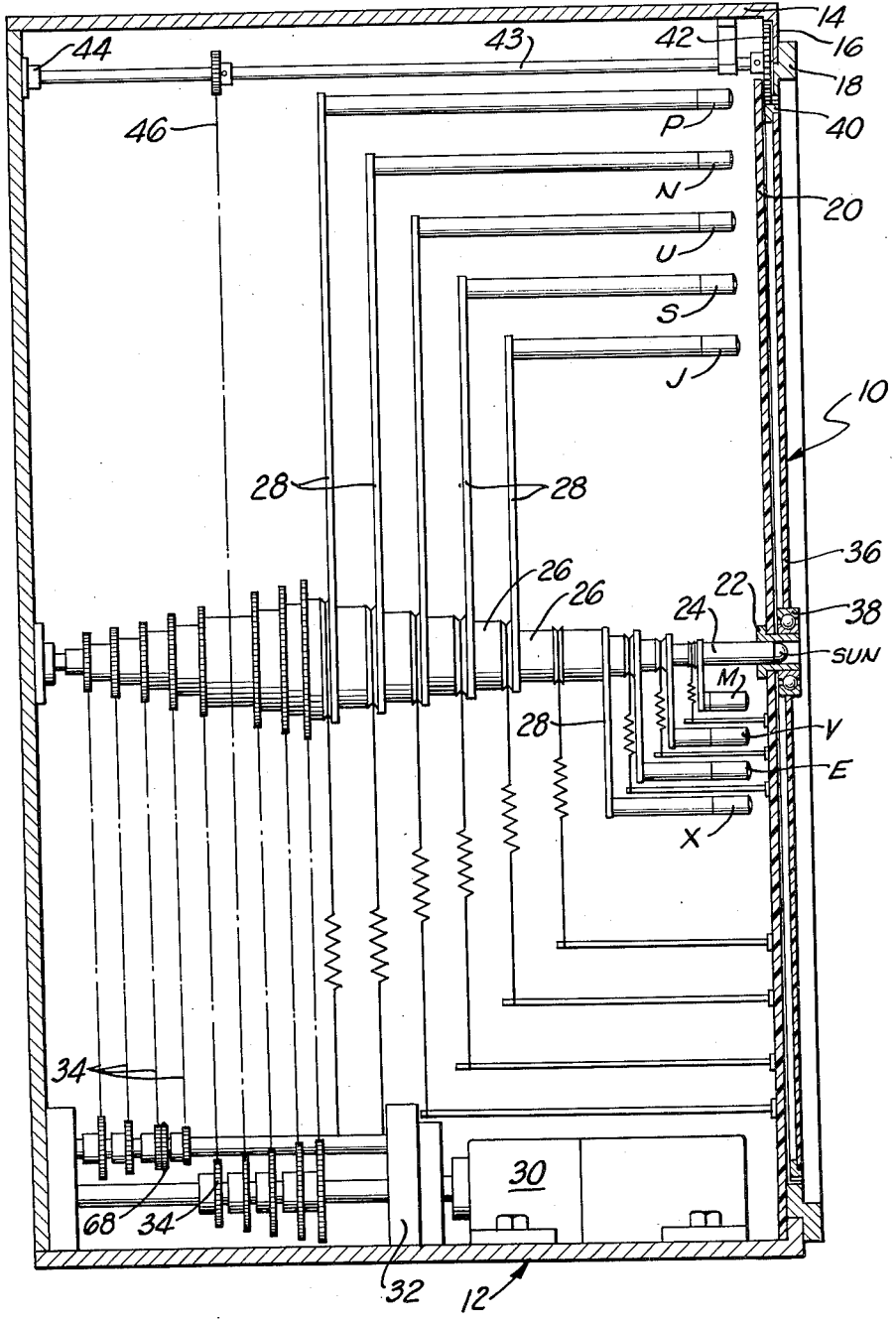
FIG. 2 is a cross-sectional view taken at line 2—2 of FIG. 1.

The accompanying drawing is primarily intended so as to illustrate a presently preferred means of constructing a computing apparatus falling within the scope of this disclosure. This particular computing apparatus is built so as to include as an integral part of it an orrery or planetarium type structure as described in the aforenoted co-pending application. The present invention is not, however, limited to computing apparatus built so as to include orreries or planetarium structures as exactly shown in this co-pending application. Through the use or exercise of routine engineering skill or ability the basic features or principles of this invention can be embodied within other differently appearing structures than the specific structures shown and described in this specification.

As an aid to understanding this invention it can be stated in essentially summary form that it involves apparatuses of a computing category, each of which includes means for simulating at least part of the solar system, including the Sun and various planets, and means for rotating the means simulating planets at proportional speeds around the means simulating the Sun. An apparatus of this invention also includes in addition to these parts a chart type of structure having a chart center located adjacent to one of the means simulating a body of our solar system and means for moving this chart structure in synchronism with the movement of this means simulating a body of solar system around the means simulating the Sun at the same speed at which this means simulating the body of our solar system is rotated about the Sun. A complete computing apparatus of this invention also may include an ephemeris clock-like structure for recording and indicating relative time intervals corresponding to the time intervals of movements of various parts of the solar system.

This invention is more fully described by referring directly to the accompanying drawing in which there is shown a complete computing apparatus 10 built so as to become an integral part of an orrery or planetarium 12. This orrery or planetarium 12 is preferably constructed as indicated in the aforenoted co-pending application. Since the entire disclosure of this co-pending application is incorporated in this specification by reference various parts of the orrery 12 which are unrelated to or non-essential to a complete understanding of this present invention are not completely described herein.

The orrery 12 includes a box-like housing 14 having a front side 16. A circular frame 18 is mounted upon this front side 16 and is used to support a translucent screen 20. In the center of the screen 20 there is located a small annular bracket 22 which serves to hold an extremity of a center shaft 24. This shaft 24 is surrounded by a series of concentric shafts 26, each of which carries an arm 28. These arms 28 carry light sources M, V, E, L, X, J, U, N, and P, which simulate the planet Mercury, the planet Venus, the planet Earth, the moon around the planet Earth, the planet Mars, the planet Jupiter, the planet Saturn, the planet Uranus, the planet Neptune and the planet Pluto, respectively. If desired, an annular light box (not shown) simulating an asteroid belt may be also utilized in the orrery 12 as set forth in the aforenoted co-pending application.

A further light source simulating the Sun and designated in the drawing by the word "Sun" is carried by the center shaft 24 so as to be located within the bracket 22. The various shafts 26 are adapted to be driven at speeds which are proportional to the speeds at which the bodies simulated by the light sources connected to these shafts move around the Sun through the use of a small motor 30 and a gear box 32 attached to this motor, and a series of chain drives 34. Obviously, of course, gear or other mechanical drive means of a known variety may be substituted for the chain drives 34 if this is desired.

In accordance with this invention a transparent screen 36 of a circular configuration is provided with a centrally located roller bearing 38 which engages the exterior of the bracket 22 so as to support this screen 36 so that it may be rotated about the axis of the center shaft 24. Such rotation may conveniently be accomplished through the use of a peripheral ring gear 40 attached to the edge of the screen 36 and through the use of a drive gear 42 which is carried upon a shaft 43 which is rotatably mounted in the housing 14 by means of a small bearing 44. A conventional chain drive 46 connects this shaft 43 to the gear box 32 so as to cause rotation of the screen 36 at an angular velocity which is the same as the angular velocity of the light source E as the complete apparatus 10 is operated.

From this it will be seen that the bearing 38 acts as a center of rotation for the screen 36. This screen also carries what may be referred to as a chart center 48 which is located from the center of rotation of the screen 36 the same distance as the center of the light source E is located from the axis of rotation about which it is rotated. Further, preferably the chart center 48 is located in alignment with the light source E so that during the operation of the apparatus 10 the light source E is always visible directly behind the chart center 48.

The screen 36 carries a plurality of concentric circles 50 which are spaced equidistant from one another so as to specify various units of linear measurement away from the chart center 48. This screen 36 also preferably carries a plurality of radial lines 52 which are spaced at equal angles from one another and which are located so that at least one of these lines 52 extends through the center or axis of the bearing 38. The screen 36 may also carry a circle 54 located concentrically about the bearing 38 so as to clearly indicate at all times the path to be traversed by the light source E.

The indicia applied to the screen 36 (the circles 50, the lines 52, and the circle 54) may be applied to the screen as by conventional painting or similar techniques using known pigments. At the present time it is preferred to form these indicia out of phosphors sensitive to ultraviolet light. With this type of construction these indicia are visible only when ultra-violet light sources 56 carried on the exterior of the housing 14 are in operation and serve to direct ultra-violet illumination toward these indicia. Obviously various different types of indicia besides the indicia herein described can either temporarily or permanently be applied to the screen 36 in various different known manners so as to facilitate the solution of various types of problems or so as to demonstrate various things.

During the use of the complete apparatus 10 the screen 36 is rotated along with the various light sources other than the Sun previously identified. Such rotation may of course be stopped at any particular time interval so as to illustrate relative positions of various bodies of the solar system. Either during such rotation or when it is stopped relative angles, distances and the like between such bodies may be easily determined through the use of various indicia located upon the screen 36. Further, other indicia can be added to the screen as may be desired. All of the indicia located upon the screen 36 enables it to be used effectively as a chart; hence, the screen 36 may be termed a "chart means" in the apparatus 10.

Because planetary and other movements in the solar system are related to the method of computing time known on the Earth, it is preferred to embody in the complete apparatus 10 a clock type of mechanism or ephemeris 58. This ephemeris 58 includes a centrally located shaft 60 mounted upon a bearing 62 which in turn is secured to the housing 14. This shaft 60 carries a pointer 64 which rotates around a dial 66 graduated so as to indicate calendar months, various days of the months and the equinoxes and the solstices. A conventional type of chain drive 68 is used to connect the shaft 60 to the gear box 32 in order to rotate this shaft at the same angular velocity at which the screen 36 is rotated and the same angular velocity at which the light source E is rotated. Thus, each revolution of the pointer 64 corresponds to a single revolution of the planet Earth about the Sun and to one calendar year. Also a small conventional revolution counter 70 is preferably connected by means of a gear train 72 to the shaft 60 so as to record each complete revolution of this shaft. Thus, the counter 70 operates so as to record calendar years during the operation of the complete apparatus 10. Various different mechanical connections of a known type can, of course, be used to actuate the counter 70 and to turn the pointer 64.

By appropriate initial adjustment of the complete apparatus 10 so as to "set" the various light sources other than the Sun in accordance with their actual positions on any specific calendar date of any specific year and by appropriate corresponding setting of the counter 70 the pointer 64 the entire apparatus may be assembled so that during its use the relative positions of the bodies within the solar system at any past, present or future date may easily and conveniently be determined, and so that various calculations, measurements or demonstrations in the field of astronomy may be easily made and/or shown.

It is not considered necessary to set forth in this specification a complete list of all such calculations or demonstrations, if, indeed, it is even possible to list in any one document all of them. Various different factors with respect to orbital trajectory problems may be easily solved utilizing this apparatus 10. Virtually all desired types of mileage, sideral time, angular and other calculations and measurements may be made using this apparatus.

The complete apparatus 10 may, of course, be modified in various different ways. As this invention is presently utilized, planetariums as set forth in the aforenoted co-pending application are modified so as to include the screen 36 and the ephemeris 58 and appropriate controls are provided so that the screen 36 and the ephemeris 58 may be employed at the option of an individual using a planetarium as set forth in this co-opending application. Further, friction clutch means are provided whereby the positions of various bodies of the solar system may be adjusted at any time so as to correspond to the positions of these bodies as determined by appropriate tables of recognized observatories.

Those skilled in the art to which this invention pertains will realize that computing apparatuses of the type set forth in this specification are comparatively simple and that they may be easily constructed at a comparatively nominal cost. Because of this computing apparatuses as set forth herein may be sold for use for educational and other purposes at a price within the range of institutions which prior to this present invention could not afford accurate equipment necessary to adequately demonstrate and show various items such as may be demonstrated and shown with an apapratus as herein described.

Because of the nature of this invention it is to be considered as being limited solely by the appended claims forming a part of this disclosure.

I claim:
1. An apparatus which comprises:
   means for simulating at least part of the solar system including means for simulating the Sun, separate movable means for simulating planets of the solar system, and means for rotating said movable means at different speeds which are proportional to the speeds at which the planets simulated thereby move around the Sun;
   chart means for use in determining positions of various planets of the solar system with respect to other planets and the Sun, said chart means having a chart center located adjacent to one of said movable means for simulating one of said planets and having a center of rotation adjacent to said means for simulating the Sun, said means simulating the Sun and said separate movable means for simulating planets being visible with respect to said chart means; and
   means for rotating said chart means about said center of rotation at the same angular velocity at which said one of said movable means is rotated.

2. An apparatus as defined in claim 1 wherein said chart means is transparent, and wherein said means movable for simulating planets are visible through said chart means.

3. An apparatus as defined in claim 2 wherein said chart means includes a plurality of lines extending radially from said chart center, said lines being located at equal angles with respect to one another and a plurality of concentric circles located around said chart center, said circles being spaced equidistant from one another.

4. An apparatus as defined in claim 1 including recording clock means for recording and indicating movements of said one of said movable means around said Sun.

5. An apparatus as defined in claim 4 wherein said recording clock means is separate from said chart means, and wherein said recording clock means and said chart means are operatively connected to said means for rotating said one of said movable means so as to be driven in synchronism with said one of said movable means.

6. An apparatus which comprises:
   means for simulating at least part of the solar system including means for simulating the Sun, separate movable means for simulating bodies of the solar system located so as to be capable of being moved in paths corresponding to the paths taken by said bodies within a solar system, and means for moving said movable means at different speeds which are proportional to the speeds at which the bodies simulated move in paths within the solar system;
   chart means for use in determining the positions of various bodies of the solar system with respect to other bodies within a solar system, said chart means having a chart center located adjacent to one of said movable means; and means for moving said chart means so that said chart center is always located adjacent to said one of said movable means.

7. An apparatus as defined in claim 6 including ephemeris means for indicating movement of one of said movable means with respect to time periods.

8. An apparatus which comprises:
   means for simulating at least part of the solar system including screen means, means for simulating the Sun located at the center of said screen means, separate movable means for simulating individual planets of the solar system including the planet Earth movably mounted adjacent to said screen means so as to be capable of being rotated about said means for simulating the Sun, and means for rotating said movable means at speeds proportional to the speeds at which the planets simulated thereby move around the Sun;
   transparent chart means for use in determining the positions of various planets of the solar system with respect to other planets and the Sun, said chart means having a chart center located adjacent to the one of said movable means for simulating the planet Earth, and being rotatably mounted adjacent to and parallel with said screen means so as to be capable of being rotated with said chart center following the path of the movable means for simulating the planet Earth; and means for rotating said chart means at the same angular velocity at which said one of said movable means simulating the planet Earth is rotated.

9. An apparatus as defined in claim 8 including ephemeris means for indicating time periods corresponding to time periods related to positions of said movable means for simulating planets;
   and means for actuating said ephemeris means in synchronism with the movement of said movable means for simulating the planet Earth.

10. An apparatus which comprises: a plurality of movable means mounted for rotation about a common axis; means for rotating said movable means about said axis at different speeds; chart means mounted for rotation about said axis, said chart means having a chart center located adjacent to one of said movable means the same distance from said axis of rotation as said one of said movable means; and means for rotating said chart means at the same speed as said one of said movable means so as to maintain said chart center in alignment with said one of said movable means.

References Cited in the file of this patent

UNITED STATES PATENTS

| 480,367 | Hallet | Aug. 9, 1892 |
| 575,735 | Reese | Jan. 26, 1897 |
| 2,442,297 | Link | May 25, 1948 |

OTHER REFERENCES

"A Model of the Universe," copyright 1959, by Clair Omar Musser.